Nov. 5, 1963     K. H. FRIELINGHAUS     3,110,007
ULTRASONIC VEHICLE DETECTOR Filed Oct. 14, 1959     5 Sheets-Sheet 1

INVENTOR.
K.H. FRIELINGHAUS
BY
Forest B. Hitchcock
HIS ATTORNEY

Nov. 5, 1963  K. H. FRIELINGHAUS  3,110,007
ULTRASONIC VEHICLE DETECTOR
Filed Oct. 14, 1959  5 Sheets-Sheet 3

FIG. 3.
PULSE GENERATOR

FIG. 4.
TIME CONSTANT AND
RINGING OSCILATOR

FIG. 5.
TIME CONSTANT AND
INVERTER AMPLIFIER

FIG. 6.
ADJUSTABLE TIME CONSTANT
AND GATE GENERATOR

INVENTOR.
K. H. FRIELINGHAUS
BY
*Forest B. Hitchcock*
HIS ATTORNEY

Nov. 5, 1963     K. H. FRIELINGHAUS     3,110,007
ULTRASONIC VEHICLE DETECTOR
Filed Oct. 14, 1959     5 Sheets—Sheet 4

*INVENTOR.*
K.H. FRIELINGHAUS
BY
HIS ATTORNEY

FIG. 9.

United States Patent Office 3,110,007
Patented Nov. 5, 1963

3,110,007
ULTRASONIC VEHICLE DETECTOR
Klaus H. Frielinghaus, Rochester, N.Y., assignor to General Signal Corporation, a corporation of New York
Filed Oct. 14, 1959, Ser. No. 846,346
9 Claims. (Cl. 340—38)

This invention relates to the detection of objects and particularly vehicles by means of the effects produced by said objects or vehicles when intersecting a beam of sound energy and more particularly pertains to an improved gain control system for use with the amplifying means of such a system. This invention is analogous in subject matter to and is to be regarded as being in the nature of an improvement over what is disclosed and claimed in the prior applications of H. C. Kendall et al., Serial No. 808,736, filed April 24, 1959, now United States Patent 3,042,303 issued July 3, 1962, and J. H. Auer, Jr., Serial No. 820,325, filed June 15, 1959, now United States Patent No. 3,045,908 issued July 24, 1962, both of which are assigned to the assignee of the present invention.

In the systems disclosed in these prior applications, a beam of sound energy is directed across the path to be traversed by each object or vehicle. A receiver is provided which includes a sound transducer so positioned and directed that it receives and is responsive to the transmitted sound energy upon its reflection from the surface of the object or vehicle when it intercepts the transmitted sound beam. The transmitted sound beam is additionally so directed and the receiving transducer so positioned that, in the absence of any vehicle, the transmitted sound energy is alternatively reflected from a fixed reflecting surface to the receiving transducer. Such an arrangement is readily provided in one specific embodiment for the detection of vehicles by positioning both transmitting and receiving transducers over a lane of traffic with both directed downwardly so that the transmitted sound beam is transmitted toward and reflected from the tops of passing vehicles. The receiving transducer receives reflected sound energy from the pavement when no vehicle is present and alternatively receives sound energy from the top of each passing vehicle. By means of electronic gating circuits, sound pulses reflected from surfaces nearer the transmitting transducer than the fixed reflecting surface (such as vehicle tops, for example) are detected and differentiated as is disclosed in detail in the above-mentioned prior applications. A high degree of accuracy in object detection is achieved by the ability in these prior systems to discriminate between the desired objects or vehicles to be counted and other extraneous objects, and this is brought about, in part, by so organizing the system that a single count can be registered only by going through a complete normal cycle of events. Such cycle comprises the reception of reflections from a sound reflecting surface requiring a shorter pulse transit time between transmitting and receiving transducers than the fixed reflecting surface, the interruption of sound reflections from the fixed reflecting surface, and the re-establishment of reflections from such fixed reflecting surface. This last-mentioned re-establishment of reflections is indicative of the departure from the detection zone of the object or vehicle being detected and/or counted.

The receiving transducer must be responsive to reflected sound waves of quite low amplitude, and for this reason the output of this receiving transducer must be applied to an amplifier of fairly high gain. As is customary in the use of electronic circuits, it is desirable that the receiver output have an amplitude falling within a specified range so that it may properly operate relay or other device which will give a distinctive indication of the passage of a vehicle. Such relatively uniform output is desired to be obtained even though the receiver input may vary over fairly wide limits as a result of variations in the output signal of the sound transmitter, differences in the ability of transmitting and receiving transducers to convert sound energy to electrical energy, differences in line loss, differences in the path lengths of the transmitted and reflected sound pulses, and differences in atmospheric and general weather conditions affecting sound conduction through air and affecting the various surfaces from which the sound pulses are reflected. It is customary in the electronic art, when faced with problems of this type, to provide an automatic gain control circuit for the receiver so that the over-all gain of the receiver is varied in accordance with the amplitude of the output signal, becoming greater, of course, when the output signal is of low amplitude and automatically becoming less as the output signal amplitude increases.

The use of an ordinary gain control circuit has, however, a number of disadvantages when used in connection with a receiver in a system such as briefly described above, and these disadvantages tend to outweight the advantages derived therefrom. More specifically, in the usual type of automatic gain control circuit, the gain of the amplifier is determined by the level of the complete output signal. But this would tend to produce erratic operation in a system of the kind here contemplated since the amplifier output as a whole is highly variable in its level. The reason for this is that it not only comprises signals corresponding to reflections from the fixed reflecting surface in the absence of an object or vehicle, but also reflections from objects or vehicles when they are present, signals from both objects and the fixed reflecting surface when a small object such as a pedestrian or animal stands within the detection zone, and various shock-induced signals which may be generated by the objects themselves as, for example, when a noisy vehicle passes by or when a vehicle backfires when in the detection zone. Furthermore, bearing in mind that the reflections from an object will generally be of such greater amplitude than those from the fixed reflecting surface because of the closer proximity of such objects, it will then be apparent that if the automatic gain control circuit is dependent upon the general output level of the amplifier, the amplifier gain will be greatly reduced whenever a vehicle is present within the detection zone. The result of this is that when the vehicle goes out of the detection zone, the amplifier, with its gain now sharply reduced, does not have sufficient gain to detect the reflections from the fixed reflecting surface and this means that a closely following vehicle cannot be detected since, as mentioned above, the reflections from the fixed reflecting surface must again be detected following the departure of a first object or vehicle before a following object or vehicle can be properly detected.

An additional disadvantage which results from the use of an ordinary automatic gain control circuit becomes apparent when a pedestrian is occupying the detection zone, absorbing the greater part of the transmitted sound energy, and thereby considerably decreasing the input signal to the receiver, but nevertheless providing also a small reflected signal. The ordinary automatic gain control circuit responds to this decrease in level of receiver input by increasing the receiver gain to the point where the small sound reflection produced from the pedestrian is sufficiently amplified to make it appear similar in effect in the receiver output to the effect produced by a vehicle.

Having described these attendant disadvantages of the use of an ordinary automatic gain control circuit as applied to an ultrasonic receiver for use in the system of the present invention, I have as an object of this invention to provide an improved automatic gain control circuit which functions not in accordance with the general level of the amplifier output signal, but rather with the amplitude of a particular portion of the output signal.

It is another object of this invention to provide an ultrasonic receiver for use in a vehicle detection system which embodies all of the advantages of ordinary automatic gain control circuit insofar as it compensates for changes in the general level of response caused by atmospheric conditions, snow, etc., but overcomes all the disadvantages of such circuit by adjusting the receiver gain entirely in accordance with the amplitude of a particular received signal which is not affected by transients nor by the short term disturbances in the receiver input signal produced by the momentary passage of objects or vehicles through the detection zone.

Other objects, purposes and characteristic features of the present invention will be in part obvious from the accompanying drawings and in part pointed out as the description of the invention progresses.

To simplify the illustrations and facilitate in the explanation of this invention, various parts and circuits which constitute the embodiment of the invention are shown diagrammatically and certain conventional elements are disclosed in block form since the drawings have been made more with the purpose of making it easy to understand the principles and mode of operation than to illustrate the specific construction and arrangement of parts that might be used in practice. Thus, the symbols (+) and (−) are used to indicate the positive and negative terminals, respectively, of a suitable source of direct current.

Figure 1A:
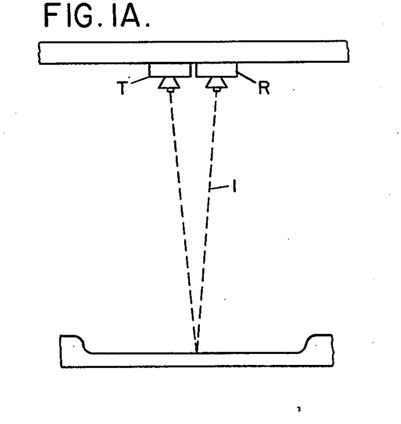
FIGS. 1A and 1B illustrate a possible arrangement of the receiving and transmitting transducers in relation to the vehicles to be detected.
Figure 1B:
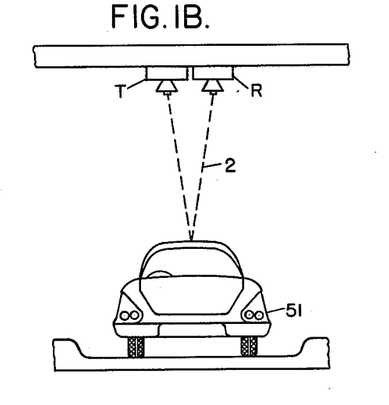

In describing the invention in detail, reference will be made to the accompanying drawings in which like reference characters designate corresponding parts throughout the several views and in which:

FIGS. 1A and 1B show two ultrasonic transducers, T and R, respectively, as they might appear when mounted over the detection lane, either entrance or exit, of a parking garage. It will be readily apparent that the two transducers may similarly be mounted over the roadway on a horizontal cross arm affixed to a vertical post positioned at the edge of the roadway.

When there is no vehicle present as in FIG. 1A, the sound waves which emanate from the transmitting transducer T are reflected from a fixed reflecting surface which in this case comprises the pavement, and after reflection, these sound waves 1 are, in part, picked up by the receiving transducer R. When a vehicle 51 passes through the detection area as shown in FIG. 1B it cuts off the normally present reflected floor or ground wave and the receiving transducer R then receives instead reflections of sound pulses from the top of the vehicle.

As mentioned above, various electronic gating circuits are employed which render it possible for the receiving circuits associated with the receiving transducer T to distinguish the reflected sound received from the vehicle 51 from the reflected sound received from the fixed reflecting surface of the pavement. This can particularly be accomplished because the transmitted sound is in the form of discrete pulses of sound energy, and each pulse has a known time of transmission from the transmitting transducer T, to the pavement, and back to the receiving, transducer R. It will be apparent from examining FIG. 1B that the transit time of each pulse will be much less when the vehicle 51 is present. In the preferred form of the invention as disclosed in the two prior applications previously mentioned, the detection of a vehicle results not only from the reception of reflected sound pulses from the top of such vehicle as in FIG. 1B, but also from the termination of the normal reflected pulses from the pavement, and additionally the apparatus is restored to normal to permit the counting of a subsequent vehicle only when reflected sound pulses are once again received by the receiving transducer R from the pavement.

In describing the circuit organization used in one specific embodiment of the invention as applied to the detection of vehicles entering and leaving a parking garage, reference will be made to the block diagram of FIG. 2, to the detailed circuits shown in FIGS. 3–6, and in addition to the waveforms illustrated in FIGS. 7A and 7B.

Figure 2:
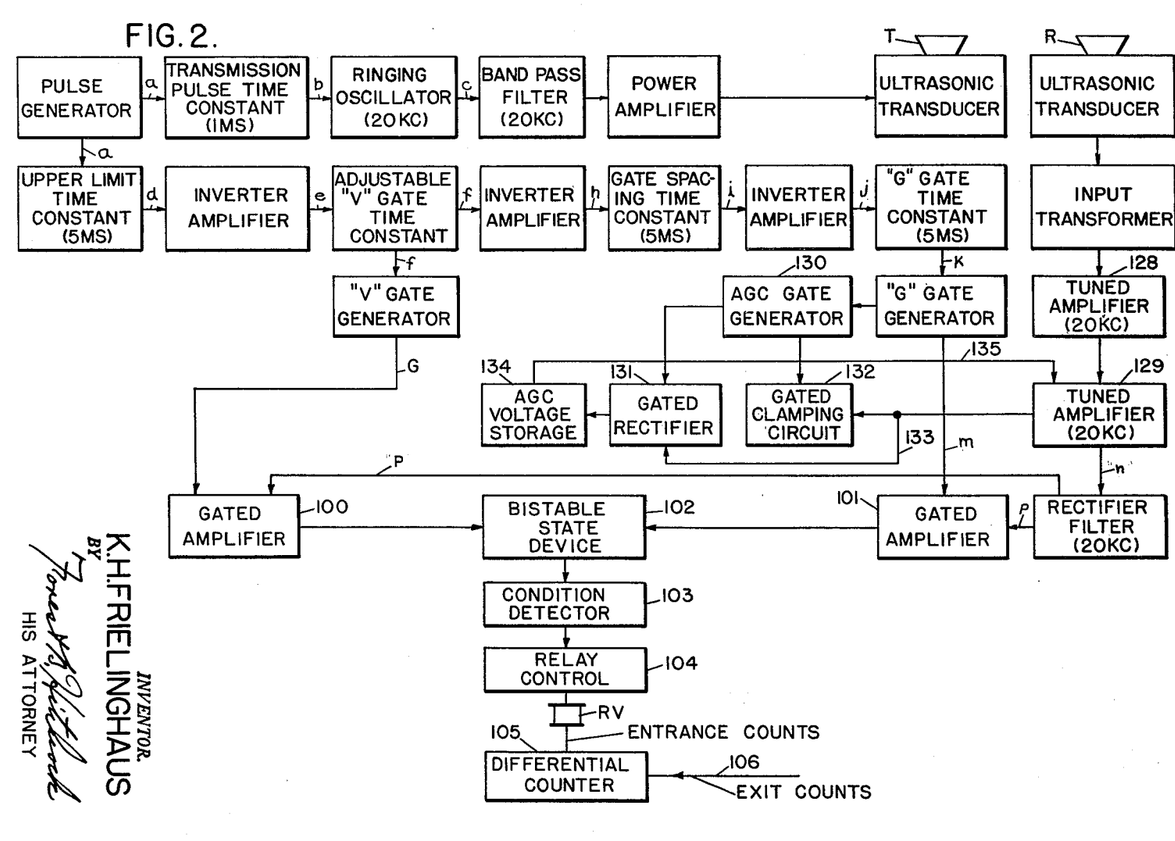
FIG. 2 is a block diagram of the detailed circuits of the vehicle detection system of this invention.
Figure 3:
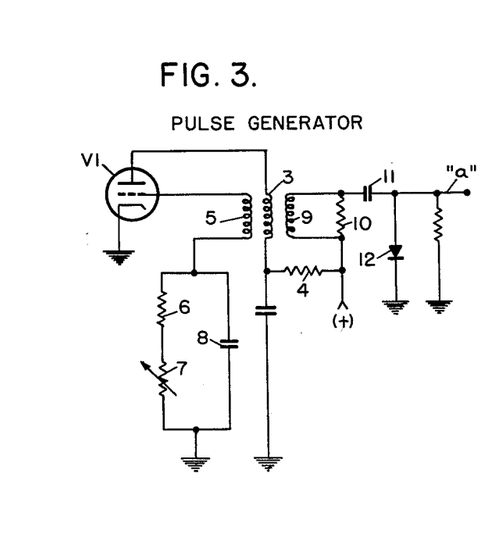
FIGS. 3, 4, 5 and 6 are schematic diagrams of typical electronic apparatus that may be used for the various circuits illustrated in block diagram form in FIG. 2.

The Pulse Generator of FIG. 2 may comprise a single-swing blocking oscillator of the kind shown in FIG. 3. The operation of such a blocking oscillator is well-known in the art and is, moreover, described in considerable detail in both of the prior applications referred to previously so that it is deemed unnecessary to provide further details of its operation. It will suffice to say that the operation of the circuit is such that there appears periodically at the output terminal "a" a negative-going pulse of voltage, and the repetition rate of these pulses is determined by the values of the various circuit components employed. In general, it may be said that the repetition rate of the blocking oscillator is selected so that the interval between successive pulses will be at least as long as the transit time from the transmitting transducer to the fixed reflecting surface and back to the receiving transducer. In this way, each reflected pulse produced in response to a particular transmitted pulse is received by the receiving transducer prior to the transmission of the next pulse from the transmitting transducer.

The negative-going trigger pulses produced by the Pulse Generator are fed to the Transmission Pulse Time Constant which, in turn, controls the operation of the ultrasonic frequency Ringing Oscillator. In this connection, although the term "ultrasonic" refers to all wave motion produced by physical vibration (as distinguished from electro-magnetic waves), occurring at frequencies above the range of audibility for the human ear, i.e., from 15,000 to 20,000 cycles per second and higher, the teachings of this invention are not to be limited to such values since they may as well be in the audible range of frequencies. For convenience in disclosing the present invention, however, the apparatus of the invention has been arbitrarily shown as designed to operate at a frequency of 20 kc.

The function of the Transmission Pulse Time Constant is to set the Ringing Oscillator into oscillation for a short predetermined time interval in response to each output pulse of the Pulse Generator. As indicated in FIG. 2, in one embodiment of this invention the circuits were organized to cause the Ringing Oscillator to be operative for a time of one millisecond each time that the Pulse Generator gave its output pulse.

Figure 4:
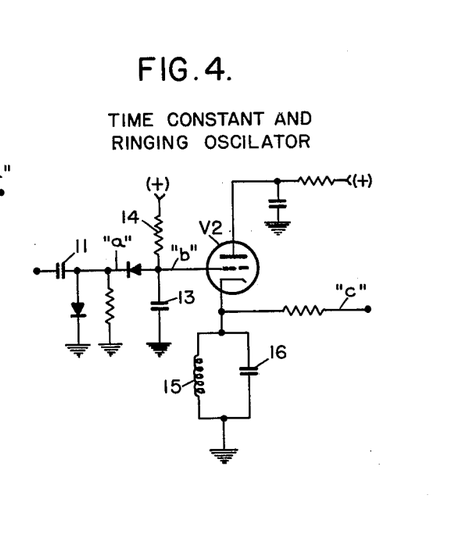
Figure 5:
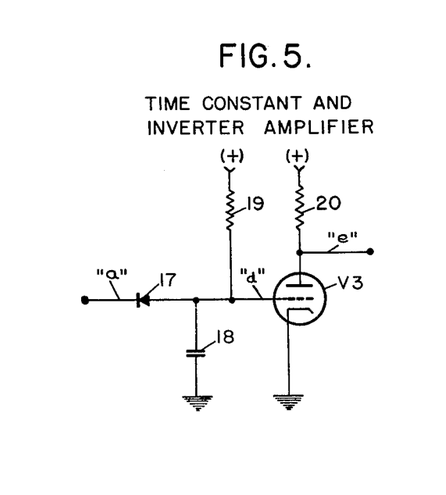

Referring to FIG. 4, the output pulses of Pulse Generator appear at point "a" and each negatively charges capacitor 13 which charge can be discharged only through resistor 14. The time constant of the discharge circuit is selected to cause the grid voltage of tube V2 to remain below cut-off for the preselected one millisecond interval in the manner shown by the corresponding waveform "*b*" of FIG. 7A.

Triode tube V2 is normally fully conductive since its grid is connected to the (+) terminal through resistor 14. When this tube becomes cut-off for the one millisecond interval, there is a ringing effect produced in the tuned cathode circuit comprising inductor 15 and capacitor 16, whose values are chosen so that oscillation will occur substantially at the desired 20 kc. frequency. At the end of the one millisecond interval, tube V2 becomes conductive again, and the oscillatory waveform of voltage across the cathode load impedance is abruptly terminated. The output of this tank circuit, represented by waveform "*c*" in FIG. 7A is then applied through the Band Pass Filter of FIG. 2 and also through the Power Amplifier to the Ultrasonic Transducer T which responds to this one millisecond pulse of 20 kc. energy by providing a corresponding one millisecond pulse of 20 kc. ultrasonic energy. This output of the transducer T is directed, in the organization of the invention illustrated in FIGS. 1A and 1B, toward the pavement over which pass the vehicles to be detected.

*Gating Timing Circuits*

Each negative-going trigger pulse provided by the Pulse Generator on its output terminal "*a*" is also used to trigger the operation of the various gate timing circuits shown in the second line of blocks in FIG. 2. The combination of Time Constants and Inverter Amplifiers that make up this portion of the over-all circuit comprise a consecutive series of circuits of the kind generally illustrated in FIG. 5, the output of each Inverter Amplifier being used to trigger the next succeeding Time Constant. More specifically, each negative-going trigger pulse appearing at point "*a*" negatively charges capacitor 18 through rectifier 17, thereby rendering the normally conductive triode tube V3 nonconductive for a time interval determined by the time constant for the discharge of capacitor 18 through resistor 19. The first Time Constant circuit, designated as the Upper Limit Time Constant, is organized to cut off the triode tube V3 for a period of five milliseconds each time that capacitor 18 is negative charged by a trigger pulse at terminal "*a*." The voltage waveforms appearing at terminals "*d*" and "*e*" of this timing circuit are illustrated by the respective waveforms "*d*" and "*e*" of FIG. 7A. This Upper Limit Time Constant determines the maximum height of vehicles that can be detected by the apparatus as will be more fully explained below.

Figure 6:
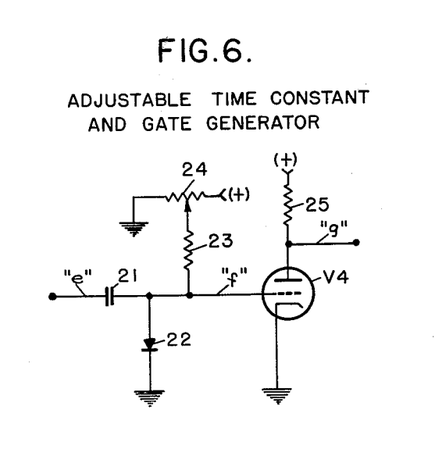

The output voltage of this first Inverter Amplifier is applied to the input of the Adjustable "V" Gate Time Constant and circuit designated Gate Generator, the detailed circuit of which is shown in FIG. 6. When the voltage at point "*e*" rises during the positive-going portion of the above-described square wave, diode 22 conducts thereby permitting capacitor 21 to readily become charged through a low time constant charging circuit. At such time, the grid potential of tube V4 remains substantially at the level of the grounded cathode. However, when the voltage at point "*e*" goes abruptly negative at the trailing edge of the square wave, this negative-going drop produces a voltage drop at the grid of tube V4 which immediately cuts off the diode 22 and also prevents any conduction between grid and cathode of this tube due to diode action. There is thus only a relatively long time constant discharge circuit for capacitor 21 and this is provided by resistor 23 and potentiometer 24 so that substantially the full amount of the voltage drop produced by each negative-going trailing edge appears at the grid of tube V4, thereby driving the grid of this tube far below cut-off. The time required for capacitor 21 to lose this negative charge can be varied by varying the position of the tap of potentiometer 24. More specifically, by moving the tap to the right, closer to the (+) terminal, the voltage tap towards which capacitor 21 discharges may be increased, thereby causing capacitor 21 to lose its negative charge more rapidly and thereby, in turn, controlling the period during which triode tube V4 remains cut off. For purposes of this disclosure, the circuit values are selected so that triode V4 will remain cut-off for a period of about nine milliseconds as shown by waveforms "*f*" and "*g*" of FIG. 7A, waveform "*f*" illustrating the grid voltage and waveform *g* illustrating the substantially square wave of plate voltage which is provided during the time tube V4 is cut off.

Referring again to FIG. 2, the output of the Adjustable "V" Gate Time Constant is applied also to an Inverter Amplifier which provides an output as shown at line "*h*." This voltage is applied to the Gate Spacing Time Constant. This latter circuit corresponds to that shown in FIG. 5 and responds to the negative-going voltage variation occurring at the trailing edge of the nine millisecond gate (see line "*h*" of FIG. 7A) by providing a spacing gate which, as indicated by lines "*i*" and "*j*" of FIG. 7A is of approximately 5 milliseconds duration.

Finally, the trailing edge of the square wave of voltage at terminal "*j*" again triggers another time constant circuit which is designated at FIG. 2 as the "G" Gate Time Constant which together with its associated "G" Gate Generator may also take the form of the circuit shown in FIG. 6. More specifically, the negative-going trailing edge of the pulse shown in line "*j*" of FIG. 7A initiates operation of the timing circuit to provide a positive gating pulse as indicated at lines "*k*" and "*m*" of FIG. 7A which is of five milliseconds duration.

With respect to the various time intervals demarcated by these timing circuits, it will be sufficient to observe that the various timing circuits are so adjusted that the "G" gate encompasses that particular interval of time following the transmission of each sound pulse during which a reflection is expected to be received, in the absence of a vehicle, from the ground or pavement. In a similar manner, the "V" gate illustrated in line "*g*" of FIG. 7A encompasses that portion of time within which a reflected pulse from a vehicle would be expected at the receiving transducer R. It will be appreciated that the particular time intervals are primarily a function of the geometry of the particular situation since obviously the spacing of the transducers above the highway will be the factor that determines the time interval between the transmission of a sound pulse and the occurrence of the "G" gate since it is this dimension that determines the transit time of each sound pulse when reflected from the pavement or ground. Further, it will be noted in FIG. 7A that the "V" gate is of considerably greater length than the "G" gate, the reason for this being, of course, that the distance from the transducers to the ground or pavement is fixed so that the pulse propagation time from the transmitting transducer to the ground and then back to the receiving transducer is a known quantity; whereas, the distance between the transducers and the top of the vehicle will naturally vary in accordance with the height of the vehicle and the longer length of the "V" gate permits considerable variation in the propagation time for a pulse that is reflected from such vehicle top.

Figure 7A:
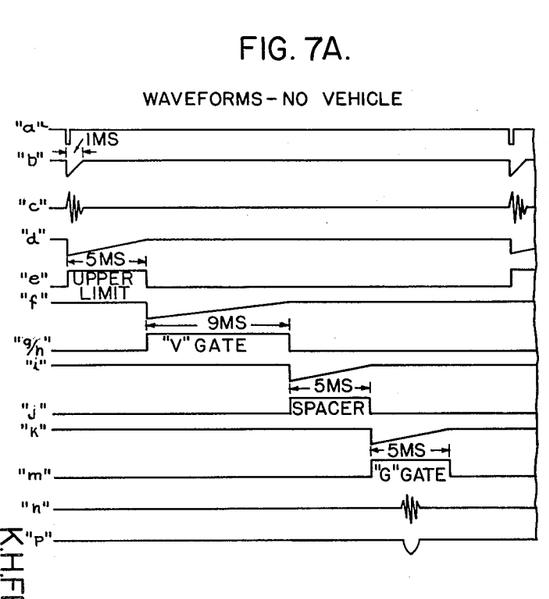
FIGS. 7A and 7B are typical waveform diagrams of voltages that may be found at various points in the overall circuit illustrated in FIG. 2, particularly showing the use of electronic gating circuits to selectively differentiate between reflected pulses of ultrasonic energy.
Figure 7B:
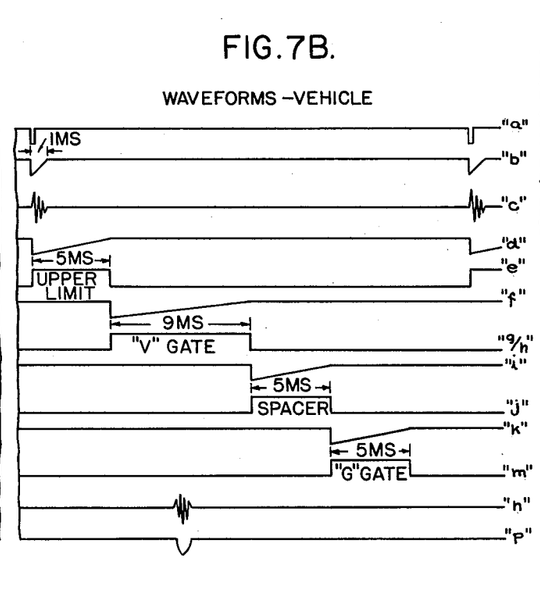

As illustrated in FIG. 7A, the "V" gate shown in line "*g*" does not start with the time of transmission of the sound pulse, but starts instead at a later time which, as shown specifically in FIG. 7A, is later by the five milliseconds demarcated by the upper limit Time Constant. For this reason it is preferable to have the "V" gate ineffective during this preliminary interval, and the receiver cannot then provide an output signal to indicate the presence of a vehicle even though it should receive some false input signal during this preliminary time.

In the foregoing description, attention has been directed to the waveforms appearing in FIG. 7A which illustrate the operation of the circuits when there is no vehicle present within the detection zone. On the other hand, FIG. 7 illustrates the circuit operation when a vehicle is present. Referring to lines "n" and "p" of FIG. 7B and comparing these with the corresponding waveforms of FIG. 7A, it will be seen that with the vehicle present there is no longer any received reflection from the pavement so that there is no 20 kc. signal amplified in the receiver at the time the "G" gate is in effect. Instead, sound pulses are now reflected from the top of the passing vehicle and are thus received sooner by the receiving transducer R and are, in fact, received by the receiving transducer during the time of the "V" gate.

*Reflected Wave Reception and Detection System*

Each pulse of sound energy beamed from the transmitting transducer T and striking either the pavement or some other reflected surface is reflected back to the receiving transducer R where it is converted to a weak electrical signal of 20 kc. frequency. The voltage of this weak signal is first increased by an Input Transformer and is then amplified twice by two successive Tuned Amplifiers 128 and 129. The output of the second Tuned Amplifier 129, which is illustrated in waveform "n" of FIG. 7A, is passed through a Rectifier-Filter circuit which feeds the resulting negative pulse corresponding to waveform "p" in FIG. 7A to the gated detection circuits comprising Gated Amplifiers 100 and 101, Bistable State Device 102, Condition Detector 103, Relay Control 104, and relay RV which controls the application of an input to the Differential Counter 105.

From the above description, it is apparent that the Gated Amplifiers 100 and 101 each receive an input pulse from the Rectifier-Filter for each reflection pulse picked up by the receiving transducer R, irrespective of whether the received sound pulse has been reflected from the ground or from a vehicle or other object to be detected. These two Gated Amplifiers 100 and 101 are gated respectively from the "V" Gate Generator and "G" Gate Generator. The gating thus provided is such that either of these amplifiers can produce an output pulse in response to an input pulse from the Rectifier-Filter only if it is at that time also gated by its respective "V" Gate Generator or "G" Gate Generator. It follows from this, therefore, that the Gated Amplifier 100 will supply an output pulse to the Bistable State Device 102 only when the "V" Gate Generator is providing its high level of gating voltage as indicated at line "g" of FIG. 7A, and this means that such output pulse is, in effect, provided only in response to a pulse reflected from the top of a vehicle. In a similar fashion, the Gated Amplifier 101 provides an output pulse to the Bistable State Device 102 only for an input pulse received from the Rectifier-Filter at the time that the "G" Gate Generator is providing its high level of output, and this means that such output pulse is provided only for a sound pulse that is reflected from the ground or pavement.

The Bistable State Device 102 has one stable state which may be designated as its "0" state to which it is operated whenever it receives a pulse from amplifier 101 and a "1" state to which it is operated by a similar pulse from amplifier 100. When in the "0" state, the device 102 supplies one distinctive kind of output to the Condition Detector 103 and a different distinctive output when it is in the "1" state. When the Condition Detector 103 has received the one distinctive output for some predetermined controllable time, it acts through the Relay Control 104 to cause relay RV to be dropped away. In other words, the continued reception of pavement reflections holds the device 102 steadily in its "0" state and the Condition Detector 103 senses this and causes relay RV to be dropped away. On the other hand, when the Condition Detector 103 has received the other kind of distinctive output for some predetermined time, it acts through the Relay Conrol 104 to cause relay RV to be picked up. This means that the continued reception of reflected pulses from a vehicle tend to insure that the device 102 remains steadily in its "1" state and a different kind of input signal is then received by the Condition Detector 103 so that it then acts through the Relay Control 104 to cause relay RV to be picked up.

When a vehicle or other object first intercepts the beam of transmitted repetitive sound pulses, there is a brief interval during which reflections may be received both from the pavement and from the vehicle. In that case, output pulses are provided alternately by both the Gated Amplifiers 100 and 101. The Bistable State Device 102 is then operated alternating between its "0" and its "1" conditions, and it then alternately provides first the one kind of output and then the other kind of output to the Condition Detector 103. The Condition Detector 103 is so organized that it will not change its control last exercised on the relay RV through the Relay Control 104 in response to such rapidly alternating different outputs from the device 102. For example, if the device 102 has for some time previous remained in its "0" state so that relay RV is dropped away according to the mode of operation outlined above, a change in conditions such that the device 102 is alternated rapidly between its two states will not affect the control provided by the Condition Detector 103 with respect to relay RV. In order for such control to be varied, it is necessary that the Bistable State Device 102 be operated to the "1" state and remain in that condition for some time which is controllable as desired before the Condition Detector 103 will change its control of relay RV and cause this relay to pick up. Similarly, the occurrence of rapidly alternating outputs from device 102 will be ineffective, when relay RV has been in a picked-up condition, to effect the release of this relay.

With respect to the detection of vehicles or other objects, this general mode of operation has the following effect: If the relay RV is dropped away because only pavement reflections have been received, this relay will still remain dropped away throughout the interval that both pavement and vehicle reflections are received. It is only when pavement reflections are no longer received and only vehicle reflections are received that the relay RV will pick up and thereby provide an input count to the Differential Counter 105. Again as the vehicle recedes, there is a brief interval when once more both vehicle and pavement reflections may be received. Although the device 102 will then rapidly alternate between its two possible states, the Condition Detector 103 will still maintain the relay RV picked up, and it is not until such time as only pavement reflections alone are received without any vehicle reflections, that the Bistable State Device 102 will remain in its "0" state so that the Condition Detector 102 can then cause relay RV to drop away.

The general description of the circuits given is believed to be adequate for the purposes of this disclosure since the circuits involving the Gated Amplifiers, the Bistable State Device 102, the Condition Detector 103 and Relay Control 104 do not constitute the subject matter particularly sought to be claimed in the present application, but rather comprise the subject matter of the aforementioned application, Ser. No. 820,325 which is assigned to the assignee of the present application.

*Improved Automatic Gain Control Circuit*

Described briefly, the automatic gain control circuit of this invention regulates the gain of the amplifier included in the receiver entirely in accordance with the amplitude of the sound pulses that are reflected from the fixed reflected surface. The gain control circuit is independent of those reflections produced by vehicles or other objects or any other extraneous signals appearing in the receiver output circuit. It is recognized that reflections are not received from the fixed reflective surface when an object is present, and to overcome this a storage means is provided for the automatic gain control voltage, which storage means is effective to store a gain control voltage representative of the amplitude of the ground reflections last received with no vehicle present and is able to hold this information even for relatively long periods of time such as might occur when a vehicle passes very slowly through the detection zone.

To accomplish the desired mode of operation, there is provided an AGC Gate Generator 130 which receives an input from the "G" Gate Generator of FIG. 2. This Gate Generator 130 provides an output pulse corresponding to each gating pulse provided by the "G" Gate Generator, and its output is applied both to the Gated Rectifier 131 and the Gated Clamping circuit 132. The Gated Clamping circuit has applied to it also the output signal of the second Tuned Amplifier 129 whose waveform is indicated at line "m" of FIGS. 7A and 7B. During the time of the "G" gate (line "m" of FIGS. 7A and 7B), the Gated Clamping circuit 132 is rendered active by the usable gating voltage of the Gate Generator 130 and is effective when thus rendered active to clamp the output voltage of the second Tuned Amplifier to substantially zero or ground voltage with the result that the input signal applied to the Gated Rectifier 131 over wire 133 corresponds in waveform to the output of the second Tuned Amplifier but has its positive peaks at ground level and varies above and below an average value that is substantially below the ground voltage level. This signal is applied to the Gated Rectifier 131, but this Gated Rectifier can pass a signal applied to it to the AGC Voltage Storage 134 only when gated "on" by the Gate Generator 130. This AGC Voltage Storage 134 thus receives on successive cycles a rectified negative voltage which represents the level of the reflected signal received from the ground or pavement. This stored voltage is effective, over wire 135, to control the gain of the second Tuned Amplifier 129 and thereby regulate the level of the output signal.

Figure 8:
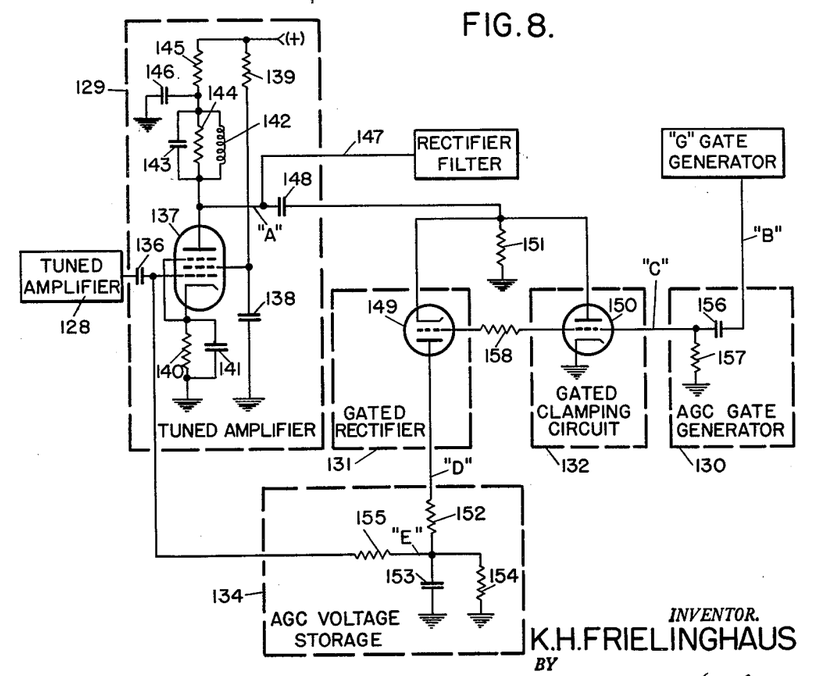
FIG. 8 is a circuit diagram of the improved automatic gain control circuit of this invention.

Reference will now be made to the detailed circuit of FIG. 8 which corresponds to the blocks 129, 130, 131, 132 and 134 of FIG. 2. The output of the Tuned Amplifier 128 is applied through a coupling capacitor 136 to the control grid of a pentode tube 137. The suppressor grid of this tube 137 is connected to its cathode, and the screen grid, which is bypassed to ground through capacitor 138, is connected through the screen dropping resistor 139 to the (+) voltage source. The desired operating bias is obtained by a cathode biasing circuit which comprises the cathode resistor 140 with its associated bypass capacitor 141. The amplifier is tuned by providing in its plate circuit a tank circuit comprising inductor 142 and parallel capacitor 143, the parallel resistor 144 being provided in parallel with the latter two elements to give the desired band-pass characteristics. The plate operating potential is provided through resistor 145 whose lower termnial is bypassed to ground by capacitor 146. A connection is made from the plate of the tube over wire 147 to the Rectifier-Filter illustrated in block form in FIG. 2.

The plate output voltage of tube 137 is also applied through a capacitor 148 to both the cathode of triode 149 and the plate of triode 150. The cathode and plate terminals of the respective tubes are connected through a resistor 151 to ground. The plate of tube 149 is connected through a resistor 152 to the upper terminals of capacitor 153 and parallel resistor 154 both of whose lower terminals are grounded. The upper junction of these latter two elements is connected through a resistor 155 to the control grid of tube 137. A gating voltage for triode tube 150 is provided by a connection of the grid of this tube through capacitor 156 to the output of the "G" Gate Generator. The grid of tube 150 is also grounded through resistor 157. Tube 149 receives a gating voltage by being connected through resistor 158 to the grid of tube 150.

As mentioned, the operating bias for tube 137 is determined in part by the bias voltage developed across the cathode resistor 140. The bias voltage is further influenced, however, by the direct-current voltage appearing across capacitor 153 since the grid of this tube is connected through resistor 155 to the upper terminal of such capacitor. It will be apparent that the more negative the voltage across capacitor 153, the greater will be the grid-cathode bias voltage for tube 137, and, by selecting this tube to have variable-mu characteristics, it is readily possible to control its gain over a relatively wide range by varying the voltage across capacitor 153.

Figure 9:
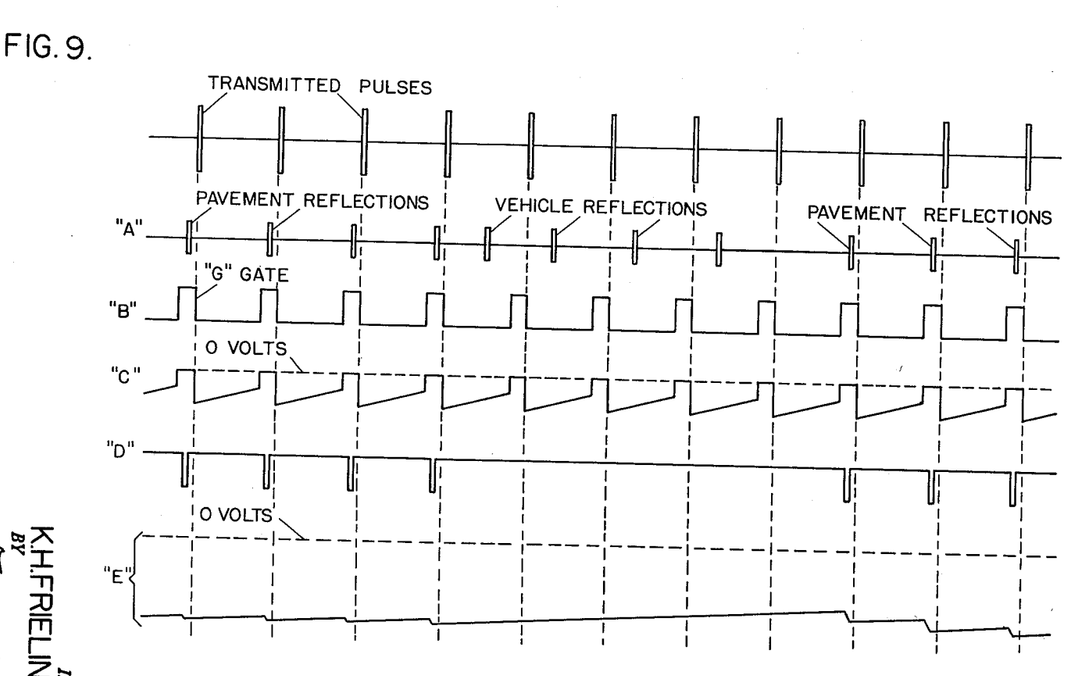
FIG. 9 is a waveform diagram illustrating the voltages appearing at various points in the circuit diagram of FIG. 8.

The voltage to which capacitor 153 is charged is determined by the voltage at the plate of tube 137 (shown on line "A" of FIG. 9), but capacitor 153 can have its charge varied according to the plate output signal only at the particular time in each successive cycle when the "G" Gate Generator is providing its positive gating voltage. More specifically, the voltage at the grid of the two tubes, 149 and 150, would obviously be at zero voltage in the absence of any output pulse from the "G" Gate Generator since the grids are both returned to ground through resistor 157. However, the effect of the output pulses of the "G" Gate Generator (see line "B" of FIG. 9) is to cause the grids of tubes 149 and 150 to be both substantially negative so as to cut off both these tubes except during the relatively small portion of each successive cycle when the "G" Gate Generator is providing its positive gating output pulse. This operation is effected by the negative-going trailing edge of each "G" gate pulse which negatively charges capacitor 156 and causes the grid voltage of these tubes to go abruptly negative, below cut off. From then until the occurrence of the positive-going leading edge of the next "G" gate pulse, the capacitor 156 discharges slowly, but the tubes 149 and 150 remain cut off until the abrupt positive-going leading edge of the next pulse drives both grids positive, thereby causing both tubes to become immediately conductive as shown in FIG. 9 at line "C."

The function of the tube 150, when gated "on" during the time of the "G" gate pulse, is to clamp the level of the received signal at the plate of this tube to the voltage of the cathode which is at ground. More specifically, the voltage at the plate of tube 150 cannot go appreciably above ground because of the diode action that then results so that the positive peak plate voltage at the plate of tube 137 results in a charging of capacitor 148 to a value which represents the voltage difference between this positive peak plate voltage and the ground voltage at the plate of tube 150. As the plate voltage of tube 137 progresses negatively from its positive peak value, tube 150 becomes immediately cut off and thus the entire excursion of plate potential of tube 137 appears as a negative voltage variation from the ground clamping level at the cathode of tube 149 as shown at line "D" of FIG. 9. Tube 149 also is gated "on" as described above during the period of the "G" gate, and the negative signal voltage appearing at the cathode of this tube 149 in the manner just described renders this tube conductive to the extent that this signal drives this cathode more negative than the plate which is normally held negative by the negative voltage to which capacitor 153 is charged. But, assuming for the moment, that the input signal does go more negative than the plate of tube 149, this tube will conduct so that the capacitor 153 can be negatively charged through the plate cathode circuit of tube 149 and through the charging resistor 152.

Between successive occurrences of the "G" gate, tube 149 is fully cut off and no further negative charging current is applied to capacitor 153 so that this capacitor can at such times discharge only through the parallel discharge resistor 154. The time constant of this discharge circuit is made very long, and in one specific embodiment of this invention was selected to be approximately 40 seconds. The result of this is that when no reflected signals are received from the pavement or ground even for a relatively long time, as when a slow-moving vehicle passes through the detection zone, the charge on capacitor 153, which is the determining factor in establishing the gain of tube 137, varies only slightly so that the amplifier gain is not appreciably affected during such interval.

In addition, the charging resistor 152 is selected to provide a fairly long time constant for the charging of capacitor 153. The result of this is that relatively large numbers of cycles of the signal are required to effect any appreciable change in the level of the voltage to which capacitor 153 is charged. In this way, the ultimate gain control voltage across capacitor 153 cannot be affected by spurious shock excitation voltages which at times occur and which may well occur during the time of the "G" gate.

To summarize the operation of the circuit, in the output signal provided by tube 137 remains constant over a prolonged interval, capacitor 153 will receive only a slight additional charge each time that tube 149 is gated on as shown in FIG. 9 at line "E", and this added charge then corresponds to the amount of charge lost by capacitor 153 between successive input charges as it slowly discharges through resistor 154. Upon an increase in the output of tube 137, capacitor 153 receives a greater amount of charge each time tube 149 is gated on but if the output of tube 137 increases rapidly in amplitude, the capacitor 153 will nevertheless become charged to a higher voltage at a much slower rate since the amount of additional charge it can receive each time that tube 149 is gated on is limited by the relatively high value of resistance provided by resistor 152. When there is a reduction in amplitude of the output of tube 137, and even when the output of tube 137 becomes substantially nonexistent at the time that tube 137 is gated on, capacitor 153 then receives no additional charge on successive cycles. The voltage across capacitor 153 then decreases slowly as it discharges through resistor 154.

The effect is that the automatic gain control voltage is determined entirely in accordance with the general level of the reflected ground or pavement signal. That is, while the automatic gain control compensates for the general signal changes caused by varying atmospheric and weather condition, it is practically immune to spurious received signals which may at times occur during the interval that the "G" gate is in effect. At the same time, the automatic gain control voltage, although established by the signal reflected from the ground or pavement on successive cycles, is also relatively unaffected when such ground signals are not received for even a rather considerable length of time. In this way, the automatic gain control is maintained when the ground reflections are cut off and this, as mentioned previously, is of considerable advantage in that it prevents the amplifier gain from increasing appreciably when an extraneous object or person is within the detection zone and is effective to absorb most of the transmitted signal and substantially cut off the normal ground reflection.

This invention has been disclosed with reference to a particular embodiment, and particularly as applied to the system disclosed in detail in the prior application, Serial No. 820,325, and it is a characteristic of this particular embodiment that reflections of transmitted sound pulses are received in the absence of the object or vehicle to be detected from a fixed sound reflecting surface. In the presence of such object or vehicle, not only are the reflections from the fixed reflecting surface blocked so that they cannot be received by the receiving means, but also the receiving means now receives sound reflections from the object or vehicle instead. It will be apparent to one skilled in the art that the invention of the present application is not intended to be limited in its application to such particular system. For example, the teachings of the present invention will apply equally well to a modification of this system where the detection of the vehicle results entirely from the cessation of reflections from the fixed reflecting surface when the object or vehicle is present and effective to block such normal reflections, and it is not required in such modification that, in the presence of the vehicle or object, sound reflections from the objector vehicle be instead detected.

It will be equally apparent to one skilled in the art that the present invention will apply as well to a system where the receiving means receives sound pulses normally from the transmitting means directly, without any intermediate reflection from a fixed sound reflecting surface.

Furthermore, the embodiment of the invention disclosed herein has dealt particularly with the detection of vehicles by means of the effect produced by such vehicles as they intercept beams of sound energy beamed vertically downward. It is apparent, that this invention can be used as well to detect, differentiate, and count other objects capable of reflecting sound energy, and that the transducers can be so positioned and directed that their beams of sound energy are directed at angles other than vertically downward. Thus, having described herein a specific embodiment of the present invention, it should be understood that the form selected has been organized particularly to facilitate in the disclosure of the invention rather than to limit the number of forms which it might assume. It should be further understood that further modifications, adaptations, and alterations may be made to the specific form shown to meet the requirements of practice within in any manner departing from the spirit of scope of the present invention.

What I claim is:

1. In a system for detecting the passage of an object, said system being of the type wherein a beam of repetitive energy pulses are produced by transmitting means and at least a portion of each pulse in the absence of said object energizes a receiving transducer a predetermined time after its generation by said transmitting means but wherein said pulses are blocked from reaching and energizing said receiving transducer at said predetermined time upon the passage of said object, that improvement comprising, amplifier means for amplifying the electrical output signal of said receiving transducer, storage means, circuit means for generating a signal proportional to the amplitude of the output of said amplifier means occurring only throughout the normal time of reception of said portion of said transmitted pulse, circuit means for applying each said generated signal to said storage means, means controlled by said signal stored in said storage means for controlling the gain of said amplifier means and means controlling said storage means to retain the signal stored therein for at least as long a time as the maximum time that said pulses are expected to be blocked by a slow moving object.

2. In a system for detecting the passage of vehicles, receiving means including a receiving transducer and also including amplifier means for amplifying the electrical signal provided by said receiving transducer, means including a transmitting transducer for transmitting repetitive energy pulses over a predetermined path with at least a portion of each pulsing impinging normally on said receiving transducer in the absence of any vehicle within a limited time interval occurring a predetermined time following its generation by said transmitting means, said receiving and transmitting transducer being so positioned and directed that each passing vehicle normally blocks said receiving transducer for a time period from receiving any portion of each pulse during said limited time interval, voltage storage means including a capacitor, circuit means for charging said capacitor to a voltage proportional in amplitude to the amplitude of the output of said amplifier means occurring only during said limited time interval, gain control means controlled by the voltage stored in said capacitor for continually controlling the gain of said amplifier means, said capacitor having a discharge time constant permitting only a slight discharge of said capacitor over the longest expected of said time periods resulting from a slow-moving vehicle, and means controlled by the output of said amplifier means for providing a distinctive output to indicate the presence of a vehicle.

3. The system according to claim 2 wherein said circuit means includes means for charging said capacitor from the output of said amplifier means only when said amplifier output during said limited time interval is greater in amplitude than the voltage then stored in said capacitor.

4. The invention as defined in claim 3 wherein said circuit means includes a charging circuit for said capacitor having a time constant being considerably longer than the said limited time interval.

5. In a system for detecting the presence of a vehicle as it moves through a detection zone defined by a beam of pulsed energy which is transmitted across its path and impinges when no vehicle is present upon a more distant fixed reflecting surface, transmitting means for transmitting said beam of pulsed energy, receiving means for receiving reflections of said transmitted beam from said fixed reflecting surface, output means controlled by the output signal of said receiving means for indicating the presence of a vehicle in said detection zone, said receiving means including variable gain amplifying means, storage means electrically coupled to said receiving means for storing a signal whose amplitude is proportional to the amplitude of the reflected signal received by said receiving means only from said fixed reflecting surface, means for electrically coupling said storage means to said amplifier means to control its gain, said storage means including means for retaining substantially all of said signal stored therein throughout the maximum expected time required for a vehicle to pass through said detection zone during which time said receiving means does not receive any reflection signal from said fixed reflecting surface.

6. The invention as defined in claim 5 wherein gating means responsive to said transmitting means controls said receiving means to produce a first output signal in response to each reflected energy pulse received from said fixed reflecting surface when no vehicle is present and to produce a second output signal in response to each energy pulse reflected from the reflecting surface of a vehicle as it passes through said detection zone, said output means being controlled jointly by said first and second output signals to register the presence of a vehicle only when successively said second and said first signals are produced, said storage means storing a signal proportional to the amplitude of said first output signal but being substantially unaffected by said second output signal.

7. The invention as defined in claim 5 wherein said storage means includes a capacitor having a discharge time constant which is a multiple of the maximum time interval that it is expected that said transmitted beam will be intercepted by a vehicle moving through said detection zone.

8. In a system for detecting the presence of a vehicle which is of the type wherein a beam of repetitive energy pulses is transmitted by transmitting means across the path of said vehicle and impinges only in the absence of said vehicle upon a fixed reflecting surface and is received after reflection by receiving means which controls output means to indicate the presence of said vehicle when said receiving means fails to receive said reflections from said fixed reflecting surface, the improvement which comprises, variable gain amplifying means included in said receiving means, gain control means including a storage means connected to said variable gain amplifying means, pulse timed means for applying to said storage means a signal proportional in amplitude to the output signal of said receiving means occurring only during a predetermined interval encompassing the expected reception time of a reflection pulse from said fixed reflecting surface, whereby said storage means repeatedly has applied to it when no vehicle is present a signal proportional to the amplitude of the signal reflected from said fixed reflecting surface but receives no signal throughout the time a vehicle is intercepting said beam, said storage means continually storing therein the signal which has previously been applied thereto from said receiving means for an interval at least as long as the maximum expected time of interruption of said beam by said vehicle.

9. The system of claim 8 in which said storage means is a capacitor and the signal stored therein is a voltage whose amplitude is proportional to the amplitude of the signal received from said fixed reflecting surface, said capacitor having a discharge time constant which exceeds the maximum expected time of interception of said beam by said vehicle.

References Cited in the file of this patent

UNITED STATES PATENTS

| 2,329,570 | Wellenstein et al. | Sept. 14, 1943 |
| 2,532,347 | Stodola | Dec. 5, 1950 |
| 2,562,309 | Fredrick et al. | July 31, 1951 |
| 2,608,651 | Emmett | Aug. 26, 1952 |
| 2,622,140 | Muller et al. | Dec. 16, 1952 |
| 2,749,537 | Loudon et al. | June 5, 1956 |
| 2,826,753 | Chapin | Mar. 11, 1958 |

FOREIGN PATENTS

| 785,001 | Great Britain | Oct. 23, 1957 |